Figure 1:
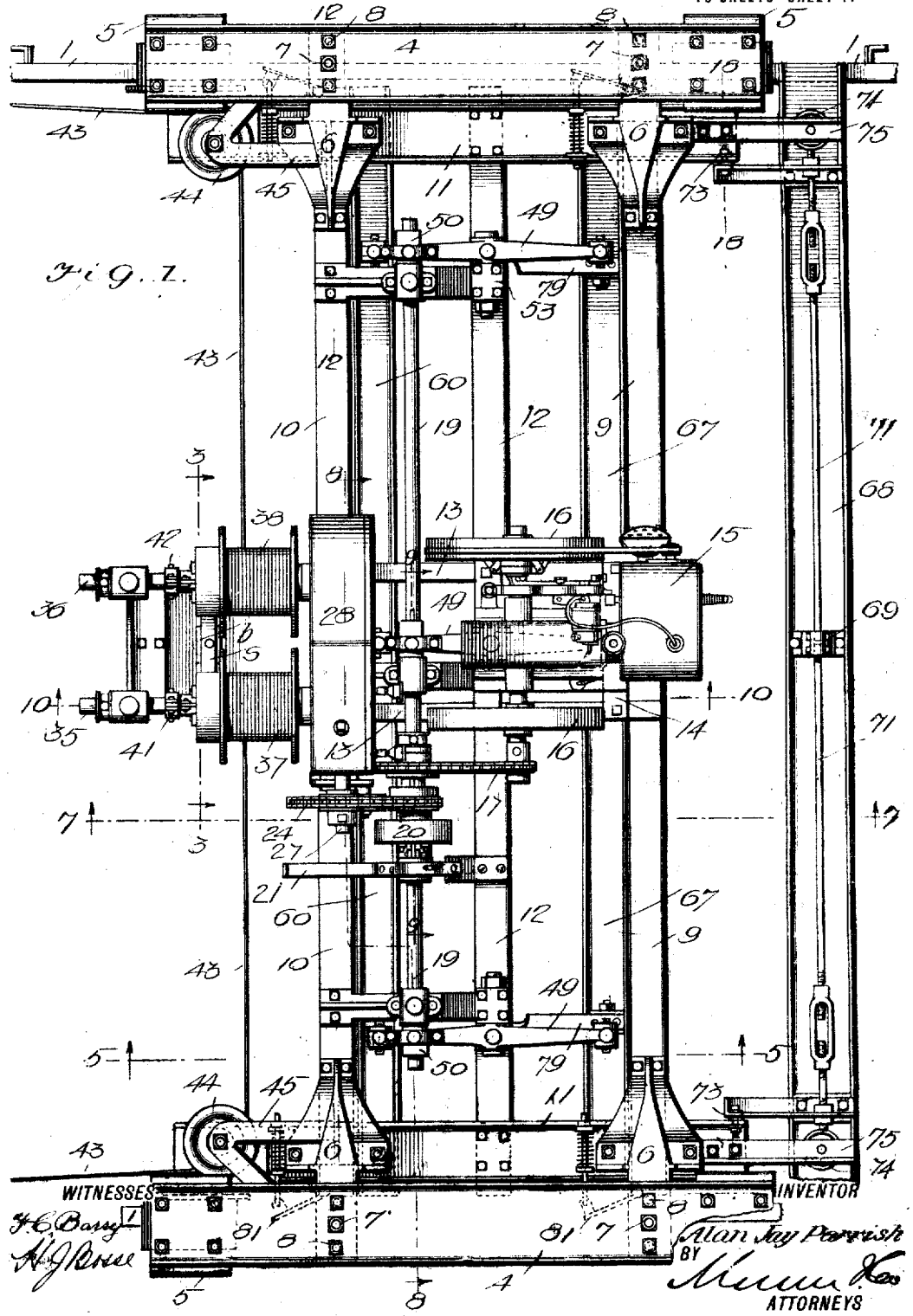

A. J. PARRISH.
MACHINE FOR MAKING CONCRETE PAVEMENTS AND THE LIKE.
APPLICATION FILED AUG. 1, 1917.

1,265,499.

Patented May 7, 1918.
10 SHEETS—SHEET 1.

WITNESSES
INVENTOR
Alan Jay Parrish
BY
ATTORNEYS

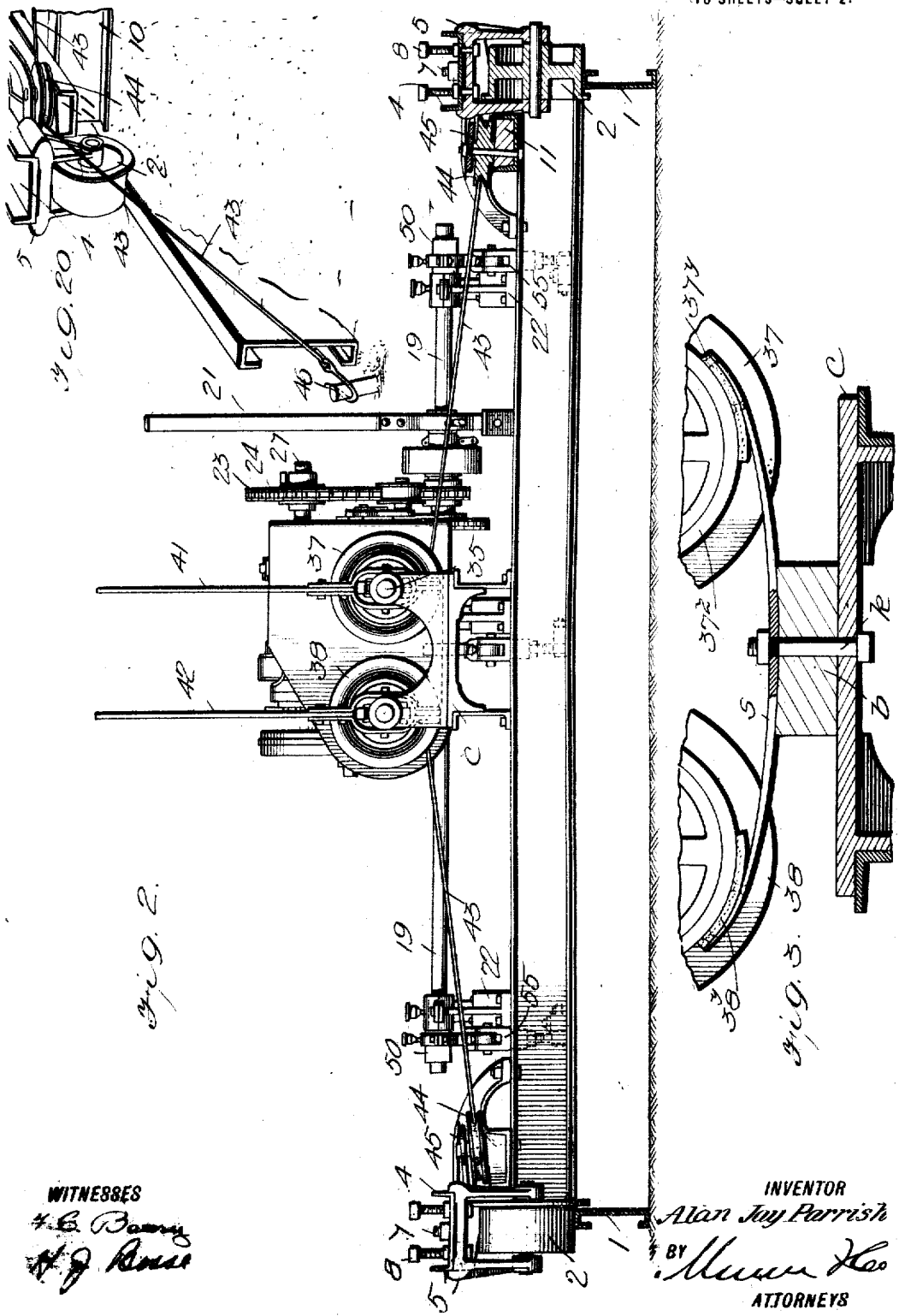

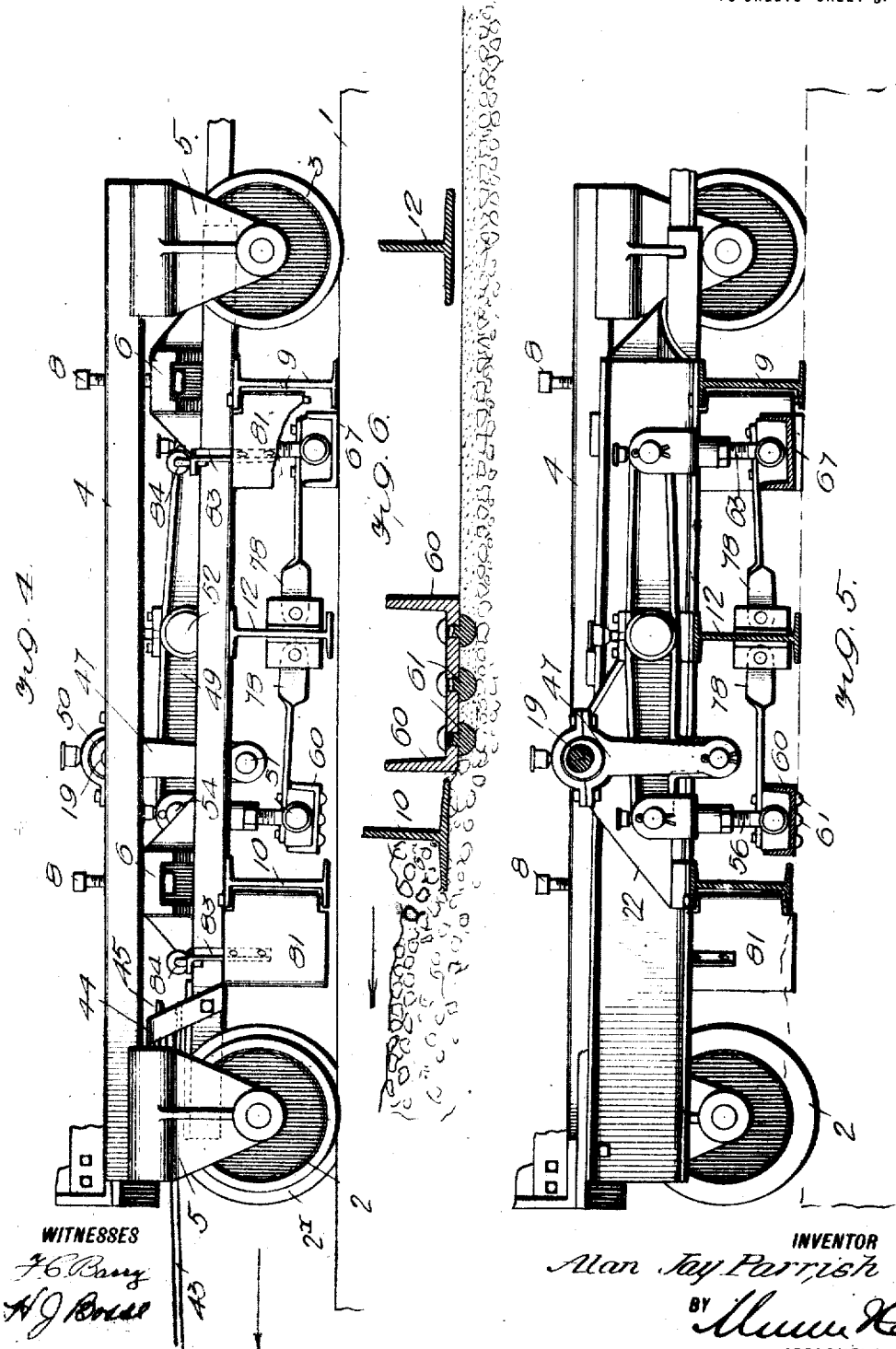

A. J. PARRISH.
MACHINE FOR MAKING CONCRETE PAVEMENTS AND THE LIKE.
APPLICATION FILED AUG. 1, 1917.
1,265,499. Patented May 7, 1918.
10 SHEETS—SHEET 4.
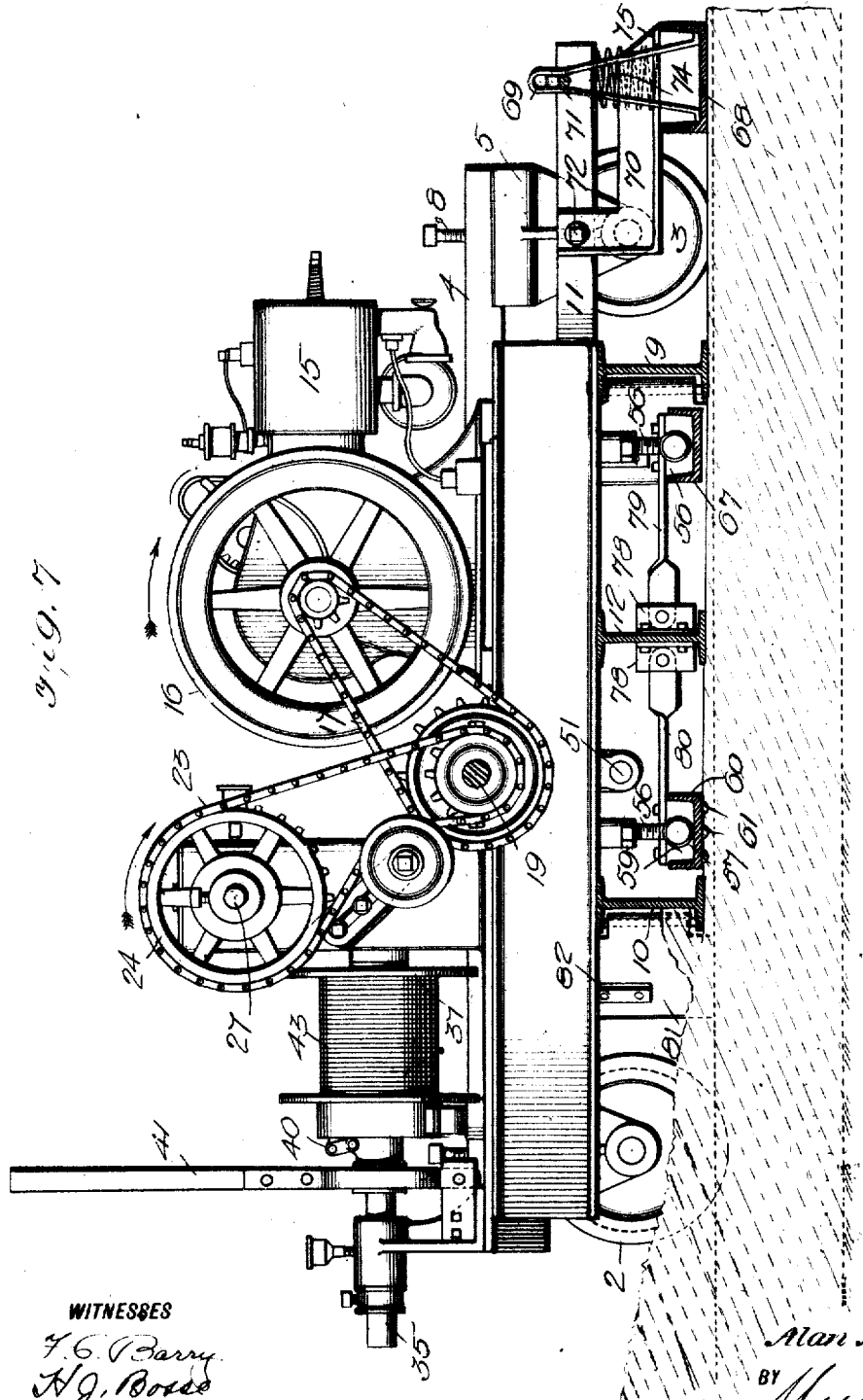
WITNESSES
INVENTOR
Alan Jay Parrish
BY
ATTORNEYS

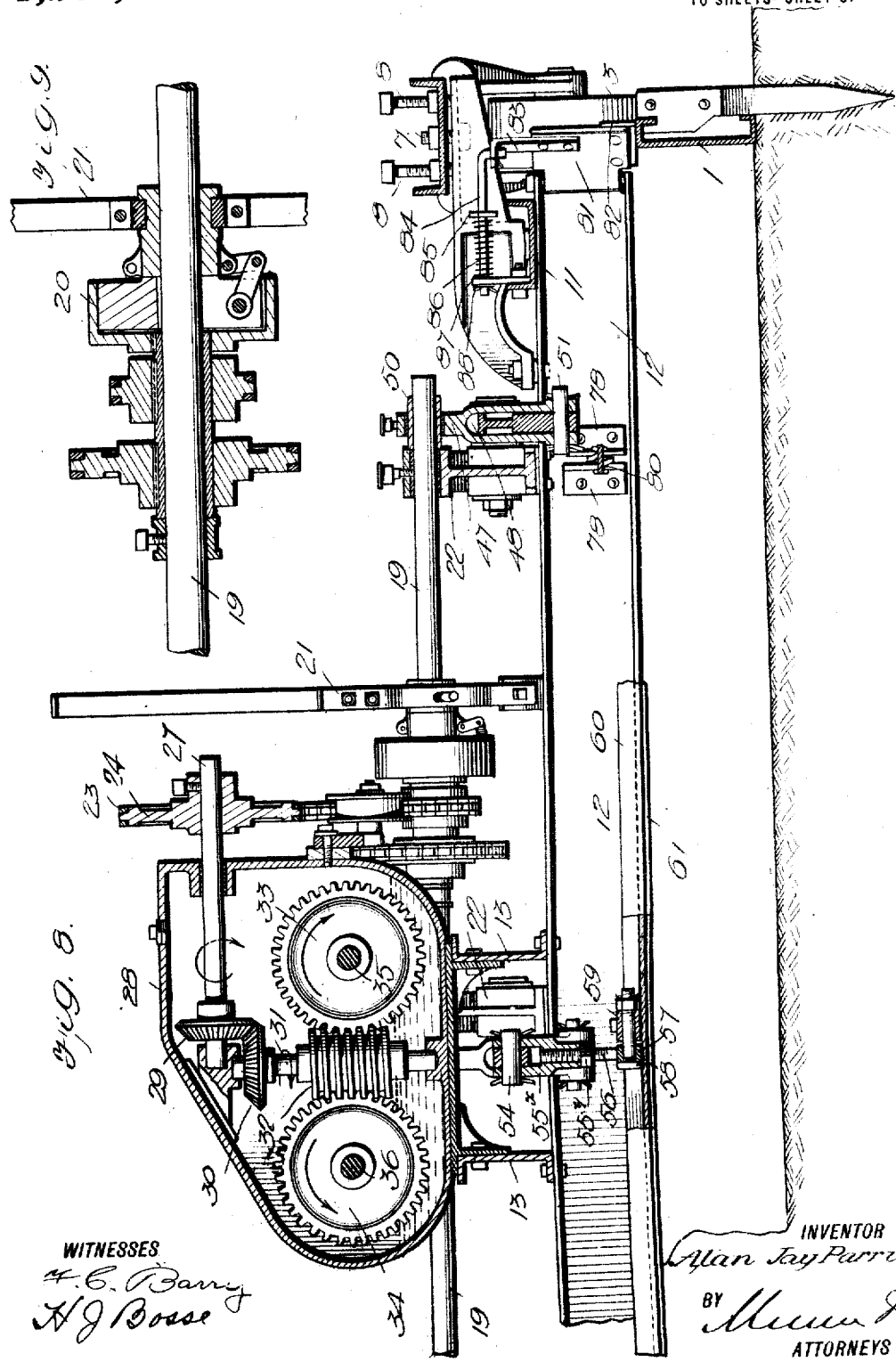

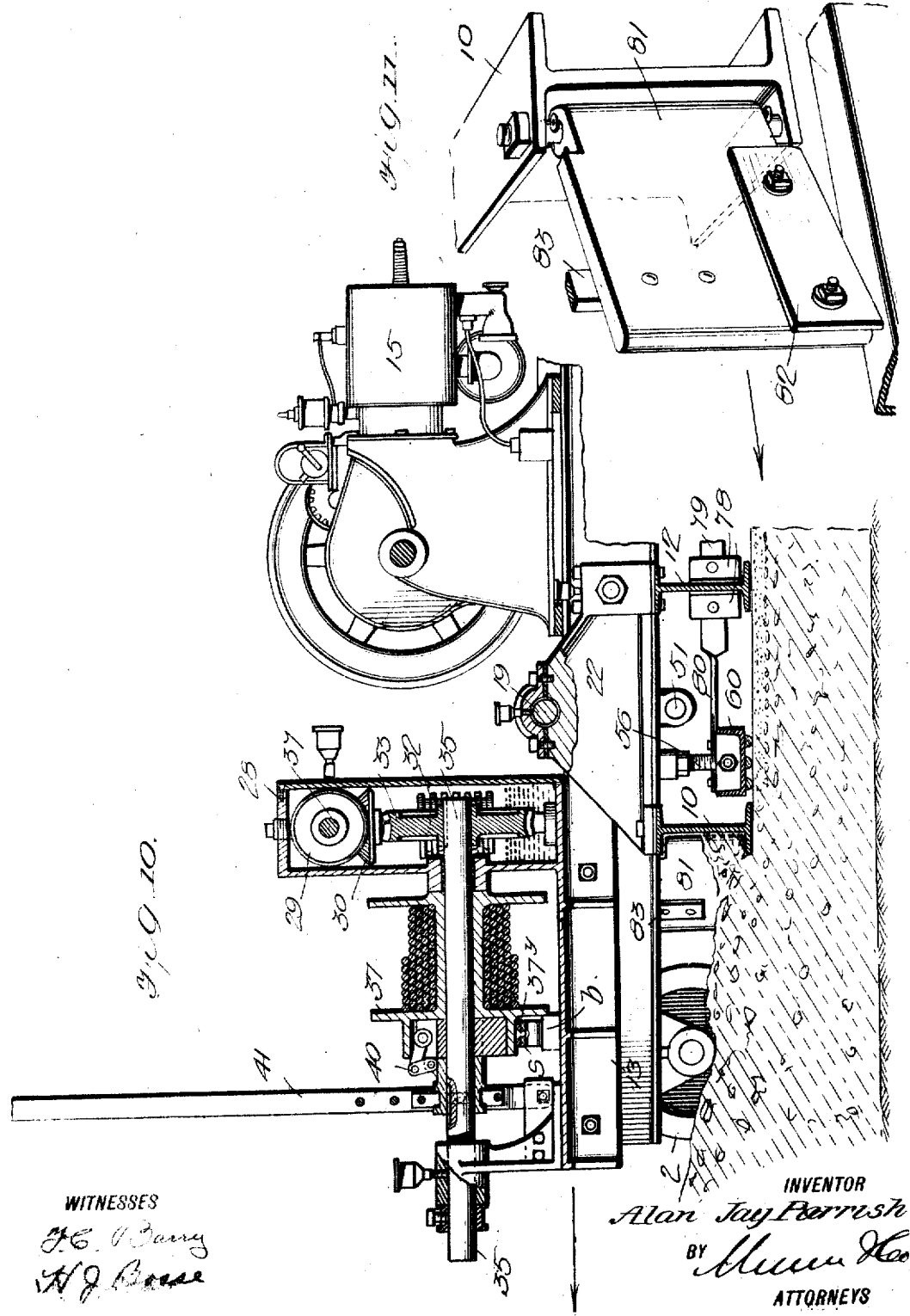

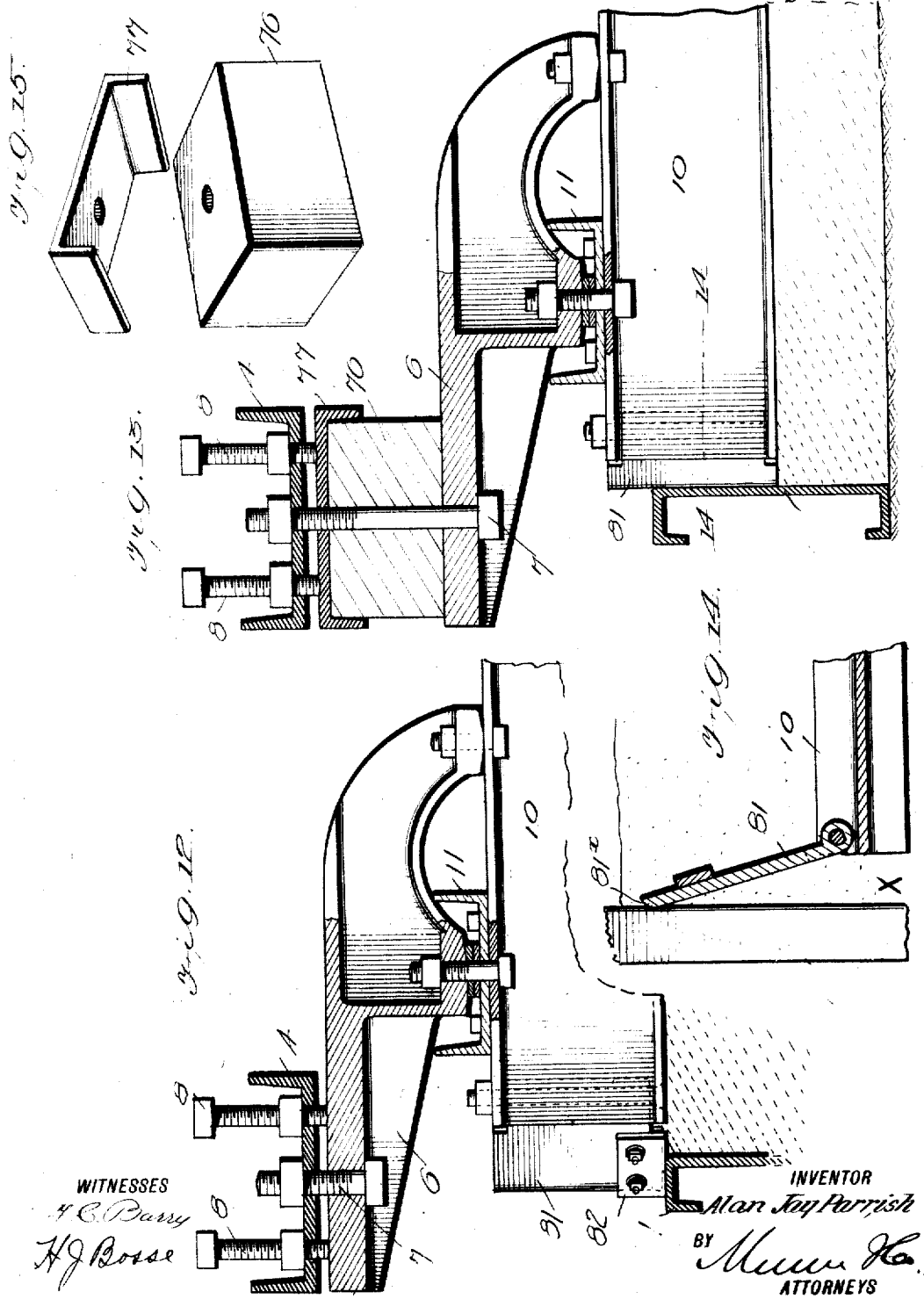

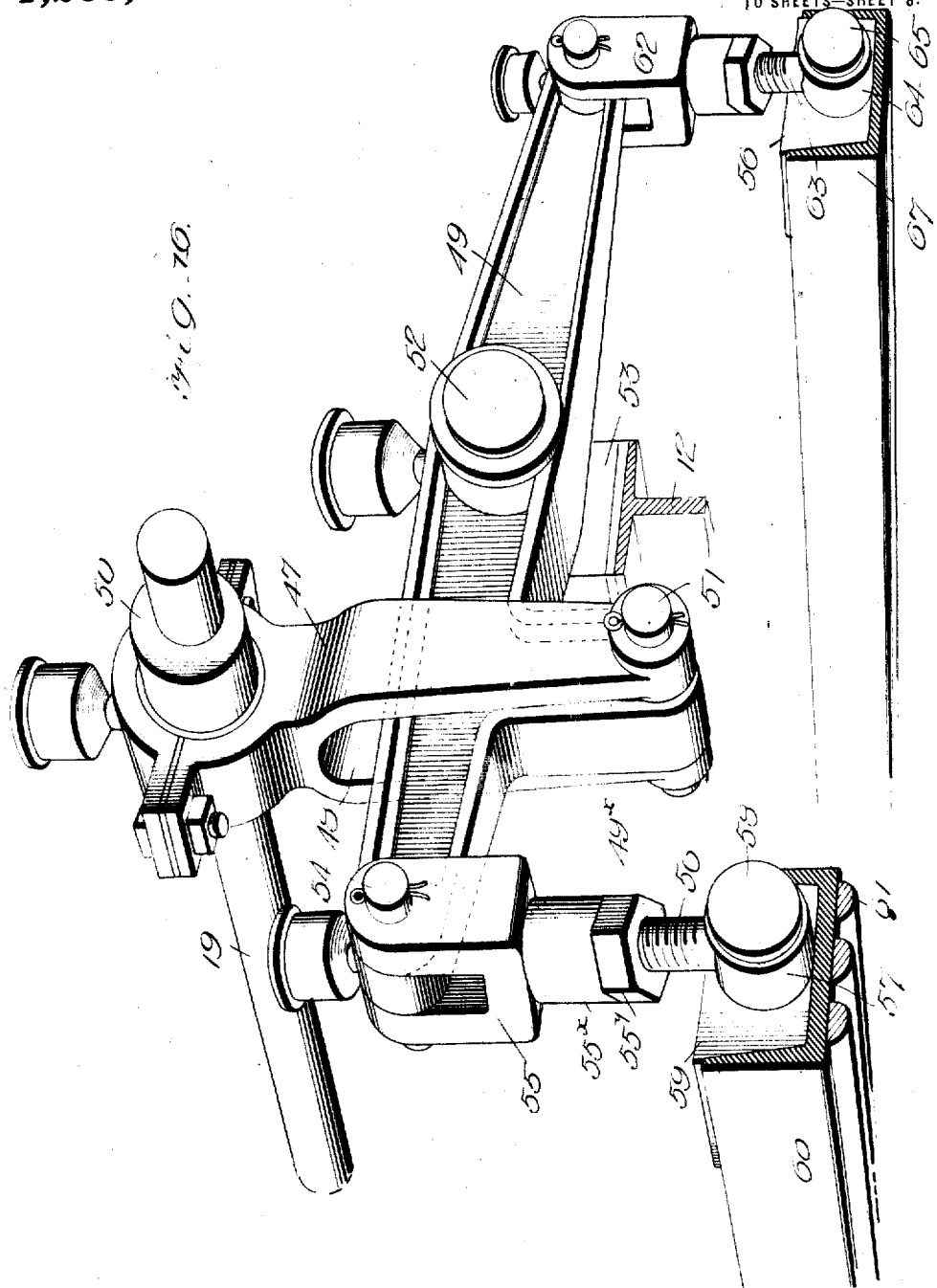

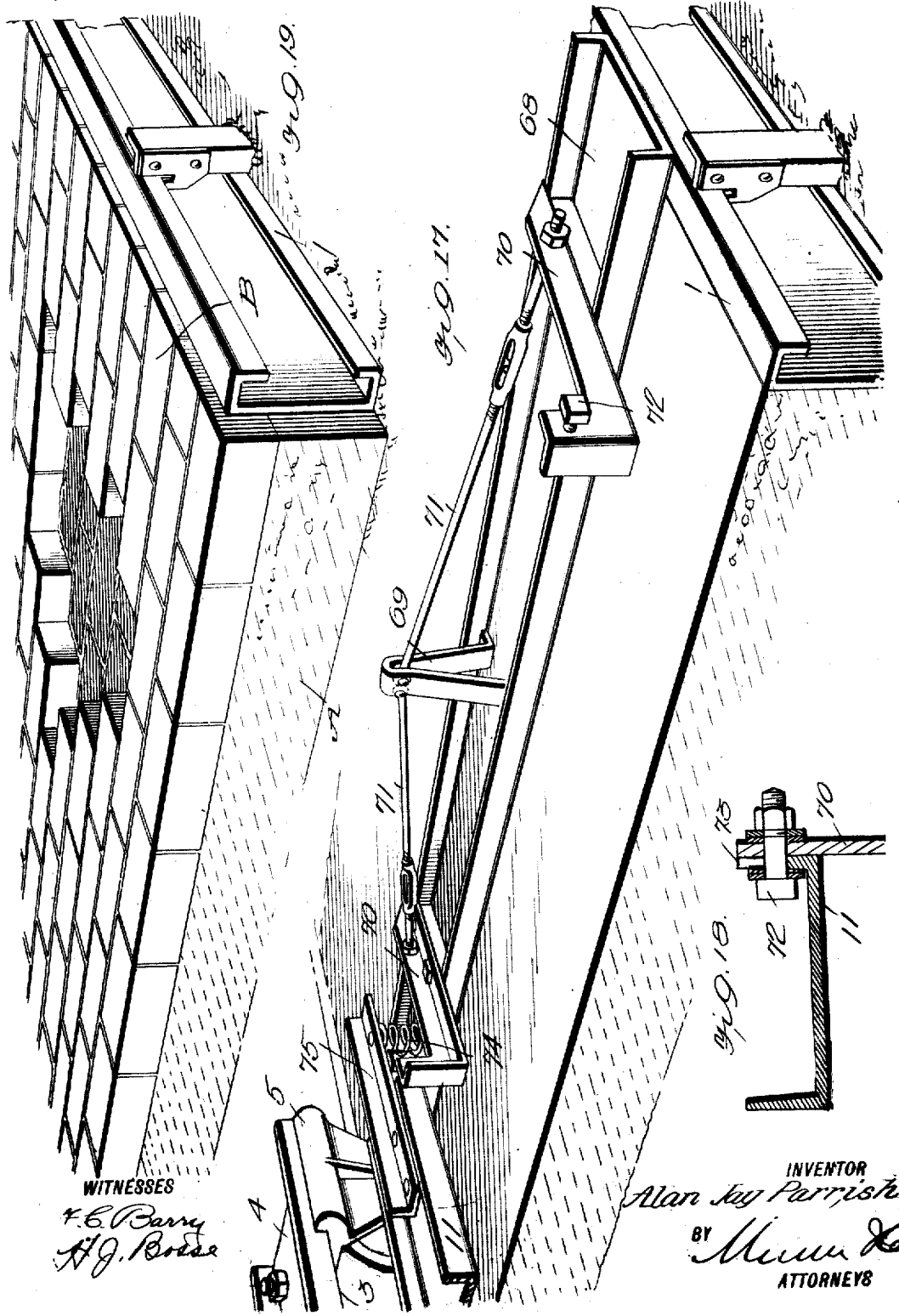

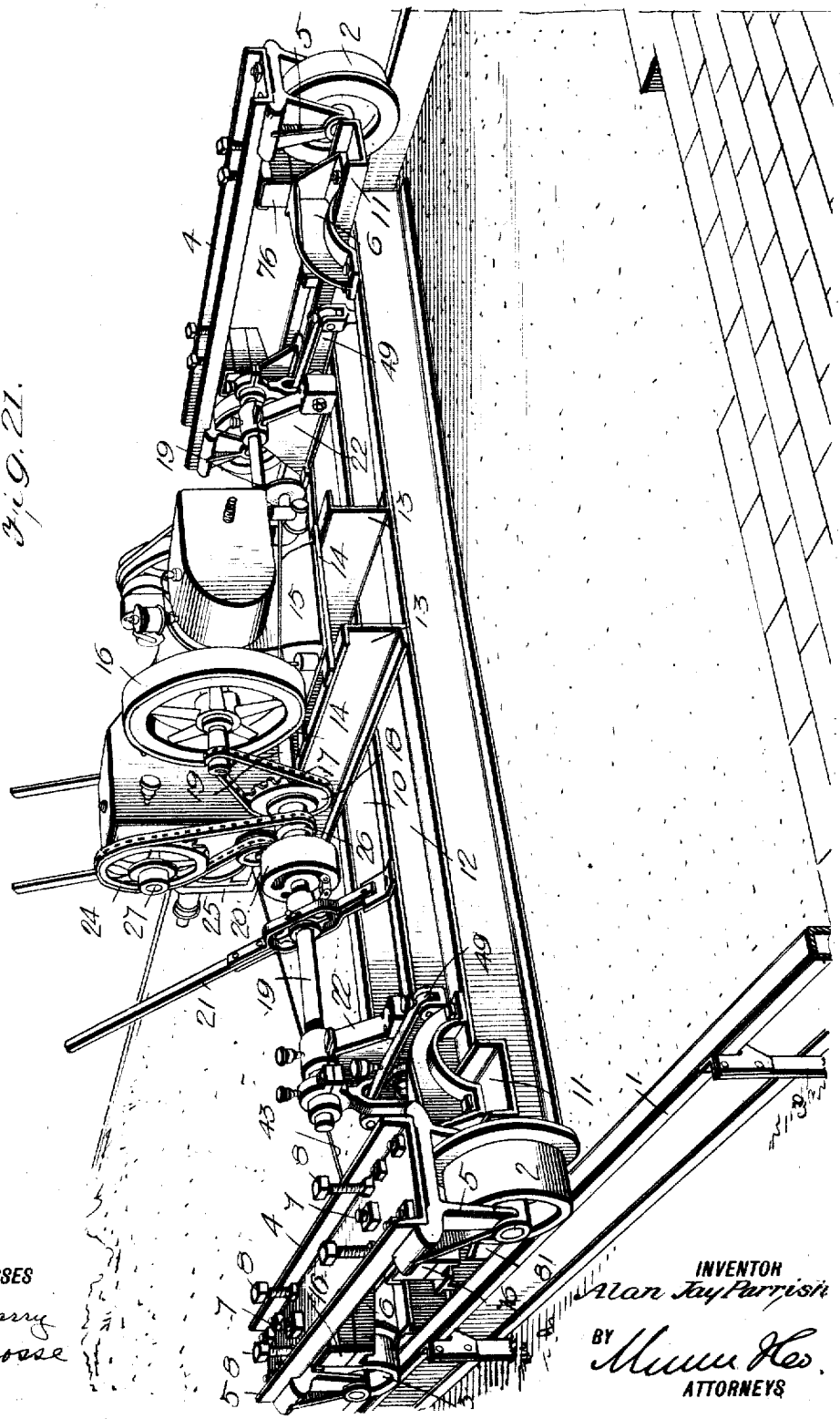

UNITED STATES PATENT OFFICE.

ALAN JAY PARRISH, OF PARIS, ILLINOIS.

MACHINE FOR MAKING CONCRETE PAVEMENTS AND THE LIKE.

1,265,499.  Specification of Letters Patent.  Patented May 7, 1918.

Application filed August 1, 1917. Serial No. 183,905.

*To all whom it may concern:*

Be it known that I, ALAN JAY PARRISH, a citizen of the United States, and a resident of Paris, in the county of Edgar and State of Illinois, have invented an Improvement in Machines for Making Concrete Pavements and the like, of which the following is a specification.

My invention relates to improvements in machines for making concrete pavements and the like, and it consists in the combinations, constructions and arrangements herein described and claimed.

An object of my invention is to provide a device which will strike off freshly laid concrete, tamp the concrete to sink the coarser aggregate and permit the mortar or finishing aggregate to come to the surface, and then smooth the tamped surface, thus imparting a final finish to the pavement.

A further object of my invention is to provide a power driven device for operating the tamping members, these power driven devices also serving to propel the machine forwardly as the pavement is laid.

A further object of my invention is to provide a device in which a frame bears the tamping members, the strike plate or beam and the smoothing member or float, means being provided to raise or lower the frame so as to make the machine applicable to pavements of different kinds, such as ordinary concrete pavements or pavements composed of a concrete base and a brick wearing surface.

A further object of my invention is to provide a device of the type described having tamping means which are rapidly operated so as to insure the tamping of the entire surface of the pavement a number of different times.

A further object of my invention is to provide a device of the type described in which the amount of pressure imparted to the tamping members may be varied at will, as well as the rate at which the tamping members are operated.

Other objects and advantages will appear in the following specification and the novel features of the invention will be particularly pointed out in the appended claims.

My invention is illustrated in the accompanying drawings, forming a part of this application, in which Figure 1 is a top plan view of the device.
Fig. 2 is a front elevation of the device.
Fig. 3 is an enlarged section on the line 3—3 of Fig. 1.
Fig. 4 is a side elevation of a portion of the device.
Fig. 5 is an enlarged section on the line 5—5 of Fig. 1.
Fig. 6 is an enlarged section of the tamping means.
Fig. 7 is an enlarged section on the line 7—7 of Fig. 1.
Fig. 8 is an enlarged section on the line 8—8 of Fig. 1.
Fig. 9 is an enlarged section on the line 9—9 of Fig. 1.
Fig. 10 is an enlarged section on the line 10—10 of Fig. 1.
Fig. 11 is an enlarged perspective view of the scraping means.
Fig. 12 is an enlarged section on the line 12—12 of Fig. 1.
Fig. 13 is an enlarged section through a bracket and its support.
Fig. 14 is an enlarged section on the line 14—14 of Fig. 13.
Fig. 15 is a detail perspective view of a spacing block and cap therefor.
Fig. 16 is an enlarged perspective view showing the tamping mechanism.
Fig. 17 is an enlarged perspective view of one form of pavement.
Fig. 18 is an enlarged section on the line 18—18 of Fig. 1.
Fig. 19 is a modified form of pavement.
Fig. 20 is a detail perspective view showing an anchoring means.
Fig. 21 is a detail perspective view of the device adjusted for making the form of pavement shown in Fig. 19.

In carrying out my invention I make use of forms for the roadway or pavement, these forms being shown at 1 and consisting preferably of U-shaped channel irons set on edge. Other forms than those shown may be used. These forms 1 are placed at the edges of the roadway or pavement. In Fig. 4 I have shown front and rear wheels 2 and 3, respectively, which are mounted to run on the forms 1. The front wheels are provided with guide flanges 2ˣ, while the rear wheels 3 do not have these flanges, when the device is used to lay concrete pavements, the wheel running on the top of the form, as shown. These wheels 2 and 3 bear a frame consisting of the longitudinal members 4 which are supported by forked brackets 5. The member 4, as will be seen from Fig. 21, is preferably a U-shaped channel iron.

Referring now particularly to Fig. 12, I have shown this channel iron carriage frame member 4 as secured to a bracket 6 by means of a bolt 7 and adjustable spacing bolts 8. There are four of these brackets 6, one at each end of each of the carriages 4. As will be seen from Fig. 21 the brackets 6, which are secured to the rear of the carriages, are also secured to the opposite ends of a beam 9, which is preferably an I-beam. The brackets 6 at the forward ends of the carriages are secured to an I-beam 10. The brackets 6 are secured to channel irons 11, see Figs. 1 and 21, which run parallel with the carriages 4; these channel irons being secured to the beams 9 and 10 and also to a central beam 12.

At 13 is a pair of transverse beams which form a support for the power mechanism. Resting on the cross members 13 are bars 14 upon which the engine 15 rests. The fly wheel 16 of the engine is connected by means of a sprocket chain 17, see Fig. 21, with a sprocket 18 on a shaft 19. A clutch 20 is controlled by a clutch lever 21 which may be moved so as to transmit power from the sprocket 18 to the shaft 19 when the clutch is in one position or to disconnect the sprocket 18 from the shaft 19 when it is in another position, thereby interrupting the transmission of power to the device. This clutch is an ordinary clutch and forms no part of the present invention. The ends of the shaft 19 are journaled in bearings 22 which are mounted on the beams 10 and 12.

Connected with the power shaft 19 is a sprocket chain 23 which runs over a sprocket wheel 24, thence over an idler 25 and back over the sprocket wheel 26 on the shaft 19. The sprocket wheel 24 is disposed on a shaft 27 which extends into an oil tight casing 28. The shaft 27 is provided with a bevel gear 29 which engages a gear 30 on a shaft 31 containing a worm 32, this worm being in engagement with the worm wheels 33 and 34, respectively, see Fig. 8. The worm wheel 33 is on a shaft 35 and the worm wheel 34 is on a shaft 36. The shafts 35 and 36 each control the operation of drums, like those shown at 37 and 38, respectively, see Fig. 2. In Fig. 10 I have shown the drum 37 as being controlled by a clutch 40 which causes the drum to rotate with the shaft 35 or to remain in position detached from the shaft according as the clutch lever 41 is in one position or another. A similar arrangement obtains with the drum 38, this drum being controlled by a clutch lever 42. Each of the drums is provided with a flexible member 43 which passes around a pulley 44 carried by one of the channels 11, this pulley being provided with a strengthening or supporting bracket 45 which holds the pulley rigidly in position. The rope or cable 43 passes forwardly and is anchored to a stake 46, see Fig. 20. Each of the drums 37 and 38 is provided with a friction brake. In Fig. 3 I have shown this brake as consisting of a single spring s having secured at its ends shoes 37ʸ and 38ʸ, respectively, arranged to engage a friction surface such as those shown at 37ᶻ and 38ᶻ, respectively. The spring s is secured to a block b by means of a bolt k which passes through a portion of the casting c. This casting c, in reality, forms a base upon which the drums 37 and 38 and the transmission casing are mounted.

Referring now particularly to Figs. 16 and 21, I have shown therein the end of the counter-shaft 19. This passes through an arm 47 which is provided with a slot 48 and which straddles a walking beam or lever 49. The arm 47 is eccentrically mounted on the shaft 19 by means of an eccentric bushing 50, so that as the shaft 19 revolves the arm is raised and lowered. The lower end of the arm 47 is pivotally secured to a depending portion 49ˣ of the walking beam 49 by means of the pivot pin 51. The walking beam is pivotally mounted on a stub shaft 52 carried by a block 53, the latter being secured to the top of the central beam 12, as shown in Figs. 1 and 16.

One end of the walking beam 49 is pivotally attached at 54 to a slotted hanger 55 which is provided with a threaded sleeve 55ˣ arranged to receive a screw 56. The latter has an integral ring or eye 57 at its end which receives a bolt 58. The latter passes through a block 59 disposed in a channel iron beam 60. The latter is provided on its under side with a series of half round ridges 61. In the drawing these ridges 61 are shown disposed longitudinally with respect to the beam 60, but it will be understood that in certain instances it might be desirable to arrange them transversely or in any other suitable way.

The opposite end of the walking beam 49 is pivotally secured to a hanger 62 which is connected with a screw 63 having an eye 64 arranged to receive a bolt 65 which enters a block 66, similar to the block 59 in a channel beam 67. The latter forms one of the tamping members, as will be explained later.

I have described one of the walking beam arrangements by means of which the tamping devices 60 and 67 are operated. There are as many of these walking beams as are necessary to properly support and operate the tamping devices 60 and 67. In the drawings I have shown three, one toward each end of the tamping devices and one at the center. In each instance the walking beam is given the reference numeral 49.

Referring now to Fig. 1 I have shown an additional finishing or float beam 68 which is parallel with the beams 60 and 67, and whose purpose is to give an extra smooth finish to the pavement where it is deemed necessary. This beam is set forth in detail in Fig. 17. It is provided with a central standard 69 and has arms 70 to which the standard is secured by means of brace rods 71. The arms 70 are provided with bolts 72 which enter slots 73 in one end of the beams 11, see Fig. 1, so as to adjustably support the beam 68. The beam 68 is used only when laying concrete pavements and it rests on the guide rails 1. The front of the beam is tipped upwardly at a very slight angle. In order to insure close contact between the beam 68 and the guide rail 1 I provide springs 74 which bear at one end upon the beam and at the other end upon arms 75 which project rearwardly from the beams 11.

I have shown how the beams 9 and 10 are supported by means of the brackets 6 and bolts 7 from the carriages 4. These beams, which constitute part of the framework of the device, may be raised or lowered by turning the bolts 7, see Fig. 12. The screws 8 are gage screws and may be set to gage the distance of the bracket 6 below the carriage 4 so that when the nut of the bolt 7 is screwed up tight the distance between the bracket 6 and the carriage will be accurately gaged.

If it is desired to lower the brackets and the framework to any considerable extent, as for instance when making a concrete base for a concrete and brick pavement of the so-called monolithic type, then spacing blocks are used, such as that shown in Figs. 13 and 15. These spacing blocks 76 are provided with metal caps 77 arranged to receive a thrust from the ends of the gage screws 8. The bolt 7 in this case is elongated so as to pass through the bracket 6 and the block 76, as well as the carriage 4. It will be understood that one of these blocks is used with each one of the bolts 7 so as to lower the framework at each of the four corners the same amount. In Fig. 21 I have shown the device with the block 76 in place, this figure being illustrative of the position of the machine when the monolithic concrete and brick pavement is being made.

In Figs. 4, 5, 7 and 8 I have shown brackets 78 which are attached to the opposite sides of the central beam 12. Pivotally connected to the bracket 78 are rock arms 79 and 80. The arms 79 are secured to the blocks 56 in the beam 67, while the arms 80 are secured to the blocks 59 in the beam 60. These blocks 56 and 59 are secured to their respective beams so that the beams themselves are secured to the arms 79 and 80 and their movement is the arc of a circle in which the radius of the circle is the arm 70 and the center of the circle is its pivot on the bracket 78.

In Fig. 11 I have shown a hinged plate 81 which is secured at the end of the beam 10. It will be understood that there are four of these hinged plates, one at each end of the beam 10 and one at each end of the beam 9. These plates serve a double purpose in that when the device is used to lay concrete pavements they will move along the top of the form 1 so as to scrape any concrete which may lodge thereon off into the space where the roadway is to be built. In order to facilitate this action I provide a resilient strip 82 which is preferably made of leather which is bolted to the hinged plate 81 in the manner shown in Fig. 11. These plates 81 are each provided with an arm 83 to which is attached a rod 84, see Fig. 8, each rod having a collar 85 against which one end of a spiral spring 86 bears, the opposite end of the spring bearing against a stationary arm 87 secured to the beam 11. The hinged plate 81 is beveled at its end, as shown at 81$^x$ in Fig. 14, so that in its forward movement it will not catch on the form 1, while at the same time being held by the tension of the spring 86 against the form, when the device is used to form the monolithic brick and concrete pavement. When, however, the device is used to form the concrete pavement, as shown in Figs. 8 and 11, then the outward movement of the plate is limited by the rod 84 which can only move a certain distance, owing to the cotter pin 88.

From the foregoing description of the various parts of the device the operation thereof may be readily understood.

Let us assume that the device is to be used for laying an ordinary concrete pavement. In such case the adjustment of the brackets 6 is that set forth in Fig. 12. If the concrete is to be tamped a given distance, say ⅜ of an inch, then the front beam 10 is set, by means of the screws 7 and gage screws 8, ⅜ of an inch above the upper surface of the forms 1, as shown in Fig. 4. The rear beam 9 is set so that the bottom thereof is flush with the upper edge of the form. The central beam 12, midway between the two beams 9 and 10, thereupon takes a position intermediate, that is to say it is one-half of the distance above the upper surface of the form 1 that the front beam is.

The tamping beam 60 is adjusted by withdrawing the pin 54, see Fig. 16, swinging the slotted hanger 55 away from the walking beam 49, unscrewing the locking nut 55$^y$ and turning the hanger so as to permit the screw 56 to enter the sleeve 55$^x$ of the hanger to the proper position. The hanger is then replaced on the walking beam. A similar adjustment is made with the rear tamping beam 67. In the case of the tamping beam 60 the idea is to adjust the lower surface of the beam so as to bring it on a level with the top of the form.

The concrete is now placed in front of the machine so as to be above the level of the forms 1, and the engine is set in motion. The turning of the shaft 19 causes the reciprocation of the walking beams 49 so as to rapidly raise and lower the tamping beams 60 and 67 alternately. By manipulating the levers 41 and 42 the device is moved forwardly, and as it moves forwardly the front beam 10 cuts or strikes the concrete preparatory to its tamping by the tamping beams 60 and 67. It is desirable to have a sufficient quantity of concrete in front of the beam 10 so as to insure a smooth surface without any voids. As the machine proceeds forwardly the tamping beam 60 engages the surface of the concrete which has been struck off by the beam 10 and the ridges on the beam 60 force the coarse aggregate down below the surface of the concrete, as shown in Fig. 6, bringing to the surface the mortar or finishing aggregate. It will be understood that this tamping beam reciprocates rapidly so that every part of the surface of the concrete is tamped a number of different times. As the beam 12 approaches the tamped surface it will tend to smooth it. Primarily the beam 12 is intended as a stiffening beam and as a tie rod, but the lower portion also serves to smooth off any irregularity that may have arisen from the tamping bar 60.

The machine is propelled forwardly in the manner described, and now the tamped part is subjected to a second tamping by means of the beam 67, after which the beam 9 smooths the tamped concrete the second time.

In case a particularly smooth surface should be desired the float beam 68 is used, so that when the machine has passed the pavement is in a finished condition. It will be observed that the beams 9, 10 and 12, as well as the tamping beams 60 and 67 and the float beam 68, are shaped to conform to the contour of the pavement which is being made, that is say some are built on a parabolic curve, some on an arc of a circle, while others may be flat.

In the building of the concrete road the surplus concrete which may be spilled on the edge of the form is scraped off by the plates 81 so as to leave the form free of stone or gravel which might otherwise cause the raising of the frame unduly. When building the concrete pavements the form shown in Figs. 4 and 5 is used. In this form the front wheels 2 are flanged while the rear wheels 3 run on the top of the form and are not provided with flanges, thereby preventing the formation of a groove next to the form, which would be the case were the flanged wheels used.

When it is desired to use the machine for making the monolithic brick road then blocks, such as those shown in Fig. 15, are used to space the brackets 6 in the manner already described. These blocks 76 are of the same thickness as the bricks to be used. In this case the hinged plates 81 engage the sides of the forms 1, as shown in Fig. 14. The leather scraper 82 is omitted when the plates 81 engage the sides of the forms. In this instance the plates serve primarily as extension strike plates rather than scrapers.

It will also be observed that where the machine is used for the monolithic pavement there is a space between the ends of the tamping beams and the form, this space being shown in Fig. 14 at X. The concrete in this space is hand tamped ahead of the hinged plate 81, which then strikes it or smooths it. It is again smoothed by the corresponding hinged plate on the rear beam 9.

In Fig. 19 I have shown the pavement constructed in accordance with the so-called monolithic type. This consists of a base A of plastic concrete upon which the blocks B are laid while the concrete is in its plastic condition. These blocks are preferably vitrified brick but may be blocks of any suitable material. The blocks are now rolled and this makes a smooth surface. It also tends to force up concrete from the bottoms of the bricks between adjacent bricks, thereby embedding the bricks in the concrete mortar forming a firm anchorage. The blocks are grouted with a cement filling, and when the concrete and cement has set the whole makes a monolithic structure which tends to remain rigidly in position.

In cutting around curves it is obviously necessary to move one end of the machine faster than the other, and for this purpose the two drums are provided. The construction is such, however, that with an engine running at ordinary speed the device is geared down so that the movement can be accurately controlled. The rate of movement of the machine forwardly is such as to keep pace with the deposit of concrete in front of it. One and a half to three feet a minute has been found a satisfactory movement. Greater or less speed may be attained by means of a gearing of different ratio or by operating the clutches to bring them to a neutral position, thus letting the engine run free.

It will be seen that by means of this device the entire width of the pavement or road is operated on uniformly. The result is that a uniform density is secured in the body of the concrete while the coarse aggregate is forced below the top and a smooth surface is secured by means of the concrete mortar which is forced to the top as stated.

It will also be observed that when the machine has passed the pavement is in a finished condition, thus obviating any hand work and saving in labor.

Up to the present time it has been impossible to make a pavement or a roadway by hand and to secure the uniform results that can be turned out by this device.

I claim:

1. A machine for making concrete pavements and the like, comprising a carriage, means for advancing the carriage to successive operative positions, a frame carried by said carriage, a walking beam pivotally mounted on the frame, and a tamping device at each end of said walking beam, one of said tamping devices being in advance of the other.

2. A machine for making concrete pavements and the like, comprising a carriage, means for advancing the carriage to successive operative positions, a frame carried by said carriage, a walking beam pivotally mounted on the frame, a tamping device at each end of said walking beam, one of said tamping devices being in advance of the other, and means for independently adjusting the vertical position of either of said tamping devices.

3. A machine for making concrete pavements and the like, comprising a carriage, means for advancing the carriage to successive operative positions, a frame carried by said carriage, a walking beam pivotally mounted on the frame, a tamping device at each end of said walking beam, one of said tamping devices being in advance of the other, means for independently adjusting the vertical position of either of said tamping devices, and means for adjusting the position of the frame vertically with respect to the carriage.

4. A machine for making concrete pavements and the like, comprising a carriage, means for advancing the carriage to successive operative positions, a frame carried by said carriage, a walking beam pivotally mounted on the frame, a tamping device at each end of said walking beam, one of said tamping devices being in advance of the other, means for independently adjusting the vertical position of either of said tamping devices, means for adjusting the position of the frame vertically with respect to the carriage, and a strike beam carried by the frame in advance of the forward tamping device.

5. A machine for making concrete pavements and the like, comprising a carriage, means for advancing the carriage to successive operative positions, a frame carried by said carriage, a walking beam pivotally mounted on the frame, a tamping device at each end of said walking beam, one of said tamping devices being in advance of the other, means for independently adjusting the vertical position of either of said tamping devices, means for adjusting the position of the frame vertically with respect to the carriage, a strike beam carried by the frame in advance of the forward tamping device, and a strike beam carried by the frame in the rear of the rear tamping device.

6. A machine for making concrete pavements and the like, comprising a pair of carriage members, a movable frame suspended between said carriage members, means for adjusting the height of the frame, means for advancing said carriage members from one operative position to another, a walking beam pivotally mounted on said frame, said walking beam being disposed parallel to the direction of advance, a tamping device at each end of said walking beam, one of said tamping devices being immediately in the rear of the other, and means for independently adjusting the vertical position of each of said tamping devices.

7. A machine for making concrete pavements and the like, comprising a carriage, means for advancing the carriage from one operative position to another, a movable frame suspended from said carriage, means for adjusting the height of the frame, a walking beam pivotally mounted on said frame, said walking beam being parallel to the direction of advance of the carriage, a tamping device carried at each end of said walking beam, one of said tamping devices being immediately in advance of the other, and a common means for reciprocating said walking beam and for actuating the carriage advancing means.

8. A machine for making concrete pavements and the like, comprising a carriage, means for advancing the carriage to successive operative positions, a walking beam pivotally mounted on the frame, and a tamping device at each end of said walking beam, one of said tamping devices being in advance of the other.

9. A machine for making concrete pavements and the like, comprising a pair of carriage members, a movable frame suspended between said carriage members, means for adjusting the height of the frame, a walking beam pivotally mounted on said frame, a tamping device secured at each end of said walking beam, means for advancing the carriage from one operative position to another, means for actuating the walking beam to cause the reciprocation of the latter, and a common power means for actuating said carriage advancing means and said walking beam reciprocating means.

10. A machine for making concrete pavements and the like, comprising a pair of carriage members, a frame supported by said carriage members, said frame including a strike beam, a pair of tamping beams disposed in parallel relation to said strike beam and in the rear of the latter, and means for reciprocating said tamping beams, one of said tamping beams being provided with a series of protuberances on the under side.

11. A machine for making concrete pavements and the like, comprising a pair of carriage members, a frame supported by said carriage members, said frame including a strike beam, a pair of tamping beams disposed in parallel relation to said strike beam and in the rear of the latter, means for reciprocating said tamping beams, one of said tamping beams being provided with a series of protuberances on the under side, and each of said tamping beams being secured to a pivoted arm whereby said beams are constrained to move in the arcs of circles.

12. A machine for making concrete pavements and the like, comprising a pair of carriage members, each of said carriage members being mounted on wheels, a frame suspended from said carriage members, means for adjusting the position of the frame, a portion of said frame constituting a strike beam, another portion of said frame constituting a second strike beam, a pair of tamping beams disposed in parallel relation with said strike beams, and means for raising one of said tamping beams and for simultaneously lowering the other.

13. A machine for making concrete pavements and the like, comprising a pair of carriage members, each of said carriage members being mounted on wheels, a frame suspended from said carriage members, means for adjusting the position of the frame, a portion of said frame constituting a strike beam, another portion of said frame constituting a second strike beam, a pair of tamping beams disposed in parallel relation with said strike beams, means for raising one of said tamping beams and for simultaneously lowering the other, said last-named means comprising a walking beam, and pivotal connections between said walking beam and each of said tamping beams.

14. A machine for making concrete pavements and the like, comprising a pair of carriage members, each of said carriage members being mounted on wheels, a frame suspended from said carriage members, means for adjusting the position of the frame, a portion of said frame constituting a strike beam, another portion of said frame constituting a second strike beam, a pair of tamping beams disposed in parallel relation with said strike beams, means for raising one of said tamping beams and for simultaneously lowering the other, said last-named means comprising a walking beam, and pivotal connections between said walking beam and each of said tamping beams, each of said tamping beams being pivotally connected to a link, the opposite end of the link being secured to a fixed pivot.

15. A machine for making concrete pavements and the like, comprising a pair of carriages, each of said carriages being provided with wheels, a frame suspended from said carriages, a power device carried by the frame, a counter-shaft driven by said power device, eccentrics carried by said counter-shaft, a plurality of walking beams operated by said eccentrics, and a pair of tamping devices secured at opposite ends of said walking beam, said tamping devices being disposed in parallel relation.

16. A machine for making concrete pavements and the like, comprising a pair of carriages, each of said carriages being provided with wheels, a frame suspended from said carriages, a power device carried by the frame, a counter-shaft driven by said power device, eccentrics carried by said counter-shaft, a plurality of walking beams operated by said eccentrics, and a pair of tamping devices secured at opposite ends of said walking beam, said tamping devices being disposed in parallel relation, certain portions of said frame constituting front and rear strike beams, said front strike beam being in advance of said tamping devices and said rear strike beam being in the rear of said tamping devices.

17. A machine for making concrete pavements and the like, comprising a pair of carriages, each of said carriages being provided with wheels, a frame suspended from said carriages, a power device carried by the frame, a counter-shaft driven by said power device, eccentrics carried by said counter-shaft, a plurality of walking beams operated by said eccentrics, a pair of tamping devices secured at opposite ends of said walking beam, said tamping devices being disposed in parallel relation, certain portions of said frame constituting front and rear strike beams, said front strike beam being in advance of said tamping devices and said rear strike beam being in the rear of said tamping devices, each of said strike beams being provided with hinged extensions at their ends and means for limiting the movement of said hinged extensions.

18. A machine for making concrete pavements and the like, comprising a carriage, a frame suspended from said carriage, said frame comprising a front strike beam, a rear templet beam, a pair of tamping beams carried between said front and said rear beams, means for reciprocating said tamping beams, and means for adjusting the stroke of the reciprocating tamping beams.

19. A machine for making concrete pavements and the like, comprising a carriage, a frame suspended from said carriage, said frame comprising a front strike beam, a rear templet beam, a pair of tamping beams carried between said front and said rear beams, means for reciprocating said tamping beams, means for adjusting the stroke of the reciprocating tamping beams, and means for raising or lowering said frame.

20. A machine for making concrete pavements and the like, comprising a carriage, a frame suspended from said carriage, said frame comprising a front strike beam, a rear templet beam, a pair of tamping beams carried between said front and said rear beams, means for reciprocating said tamping beams, means for adjusting the stroke of the reciprocating tamping beams, means for raising or lowering said frame, and a float beam disposed in the rear of said rear templet beam.

21. A machine for making concrete pavements and the like, comprising a carriage, a frame suspended from said carriage, said frame comprising a front strike beam, a rear templet beam, a pair of tamping beams carried between said front and said rear beams, means for reciprocating said tamping beams, means for adjusting the stroke of the reciprocating tamping beams, means for raising or lowering said frame, a float beam disposed in the rear of said rear templet beam, and spring means for maintaining said float beam in contact with the surface of the concrete.

22. A machine for making concrete pavements and the like, comprising a laterally movable carriage, means for advancing the carriage from one operative position to another, a frame carried thereby, a walking beam pivotally mounted on the frame, a tamping device at each end of said walking beam, said tamping devices being disposed transversely of the machine and one of said tamping devices being in advance of the other, and a strike beam disposed in advance of said front tamping device.

23. A machine for making concrete pavements and the like, comprising a laterally movable carriage, means for advancing the carriage from one operative position to another, a frame carried thereby, a walking beam pivotally mounted on the frame, a tamping device at each end of said walking beam, said tamping devices being disposed transversely of the machine and one of said tamping devices being in advance of the other, a strike beam disposed in advance of said front tamping device, and a rear strike beam in the rear of the tamping devices.

24. A machine for making concrete pavements and the like, comprising a laterally movable carriage, a frame carried thereby, a walking beam pivotally mounted on the frame, a tamping device at each end of said walking device, said tamping devices being disposed transversely of the machine and one of said tamping devices being in advance of the other, a strike beam disposed in advance of said front tamping device, a rear strike beam in the rear of the tamping device, and a central strike beam disposed between the tamping devices.

25. A machine for making concrete pavements and the like, comprising a laterally movable carriage, a frame carried thereby, a walking beam pivotally mounted on the frame, a tamping device at each end of said walking device, said tamping devices being disposed transversely of the machine and one of said tamping devices being in advance of the other, a strike beam disposed in advance of said front tamping device, a rear strike beam in the rear of the tamping device, and a central strike beam disposed between the tamping devices, said front, central and rear strike beams, being progressively lower from front to rear.

26. A machine for making concrete pavements and the like, comprising a laterally movable carriage, a frame carried thereby, a walking beam pivotally mounted on the frame, a tamping device at each end of said walking beam, said tamping devices being disposed transversely of the machine and extending the full width of the pavement and one of said tamping devices being in advance of the other, and means for independently adjusting each end of each of said tamping devices in a vertical direction.

27. A machine for making concrete pavements and the like, comprising a laterally movable carriage, a frame carried thereby, a walking beam pivotally mounted on the frame, a tamping device at each end of said walking beam, said tamping devices being disposed transversely of the machine and extending the full width of the pavement and one of said tamping devices being in advance of the other, means for independently adjusting each end of each of said tamping devices in a vertical direction, a strike beam disposed in advance of said front tamping device, a rear strike beam in the rear of said rear tamping device, and a central strike beam disposed between the tamping devices.

28. A machine for making concrete pavements and the like, comprising a laterally movable carriage, a frame carried thereby, a walking beam pivotally mounted on the frame, a tamping device at each end of said walking beam, said tamping devices being disposed transversely of the machine and extending the full width of the pavement and one of said tamping devices being in advance of the other, means for independently adjusting each end of each of said tamping devices in a vertical direction, a strike beam disposed in advance of said front tamping device, a rear strike beam in the rear of said rear tamping device, a central strike beam disposed between the tamping devices, and means for adjusting the vertical position of said strike beams and said tamping devices simultaneously.

29. A machine for making concrete pavements and the like, comprising a pair of carriage members, a movable frame suspended between said carriage members, means for adjusting the height of the frame, a walking beam pivotally mounted on said frame, a tamping device secured at each end of said walking beam, means for advancing the carriage from one operative position to another, means for actuating the walking beam to cause the reciprocation of the latter, a common power means for actuating said carriage advancing means and said walking beam reciprocating means, and means for independently adjusting the vertical position of either of said tamping devices.

30. A machine for making concrete pavements and the like, comprising a carriage, means for advancing the carriage to successive operative positions, a walking beam pivotally mounted on the frame, a tamping device at each end of said walking beam, one of said tamping devices being in advance of the other, and means for adjusting vertically, the position of the walking beam.

31. A machine for making concrete pavements and the like, comprising a carriage, means for advancing the carriage to successive operative positions, a walking beam pivotally mounted on the frame, a tamping device at each end of said walking beam, one of said tamping devices being in advance of the other, means for adjusting vertically the position of the walking beam, and means for independently adjusting the position of either of said tamping devices.

ALAN JAY PARRISH.